UNITED STATES PATENT OFFICE.

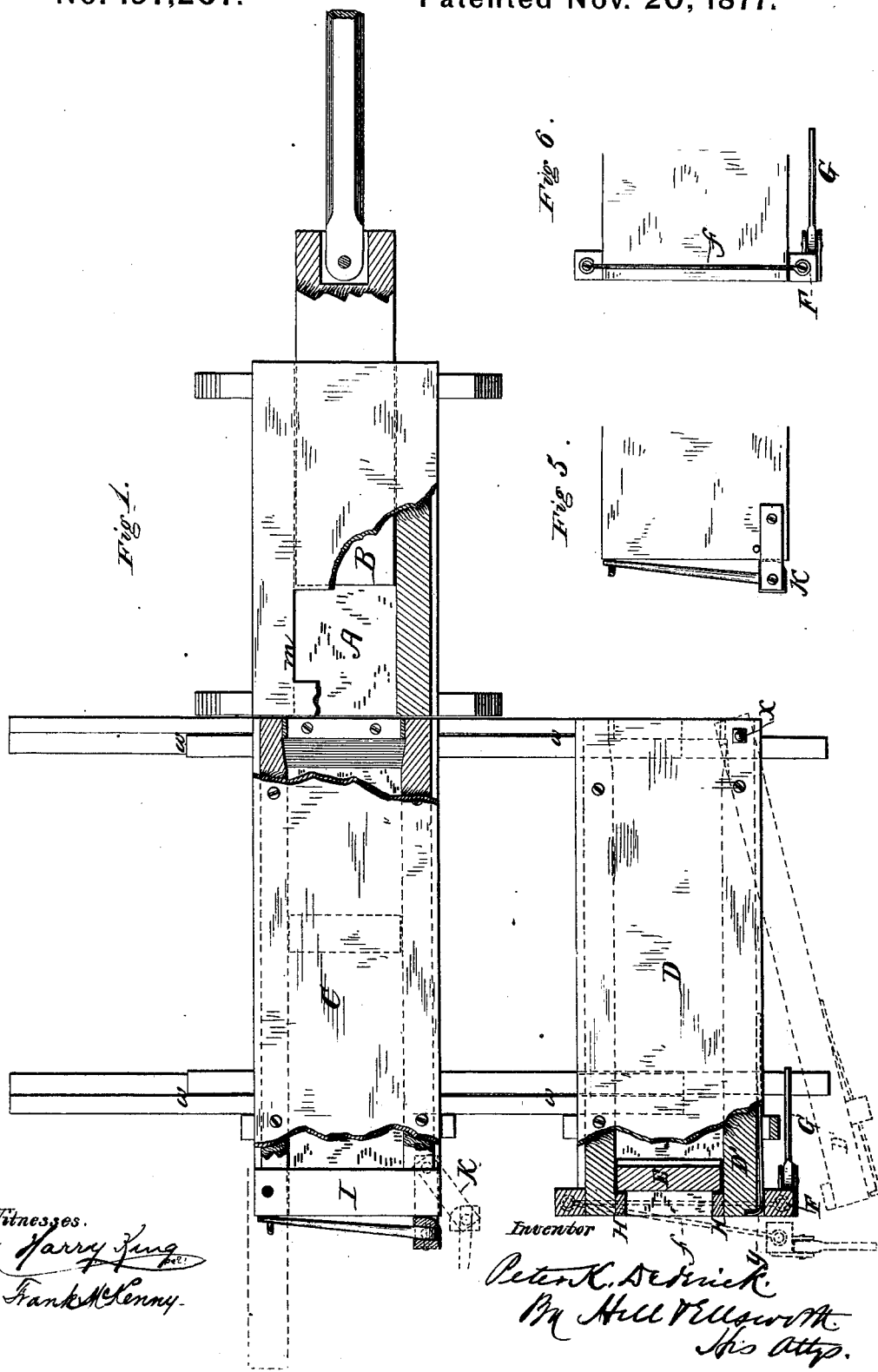

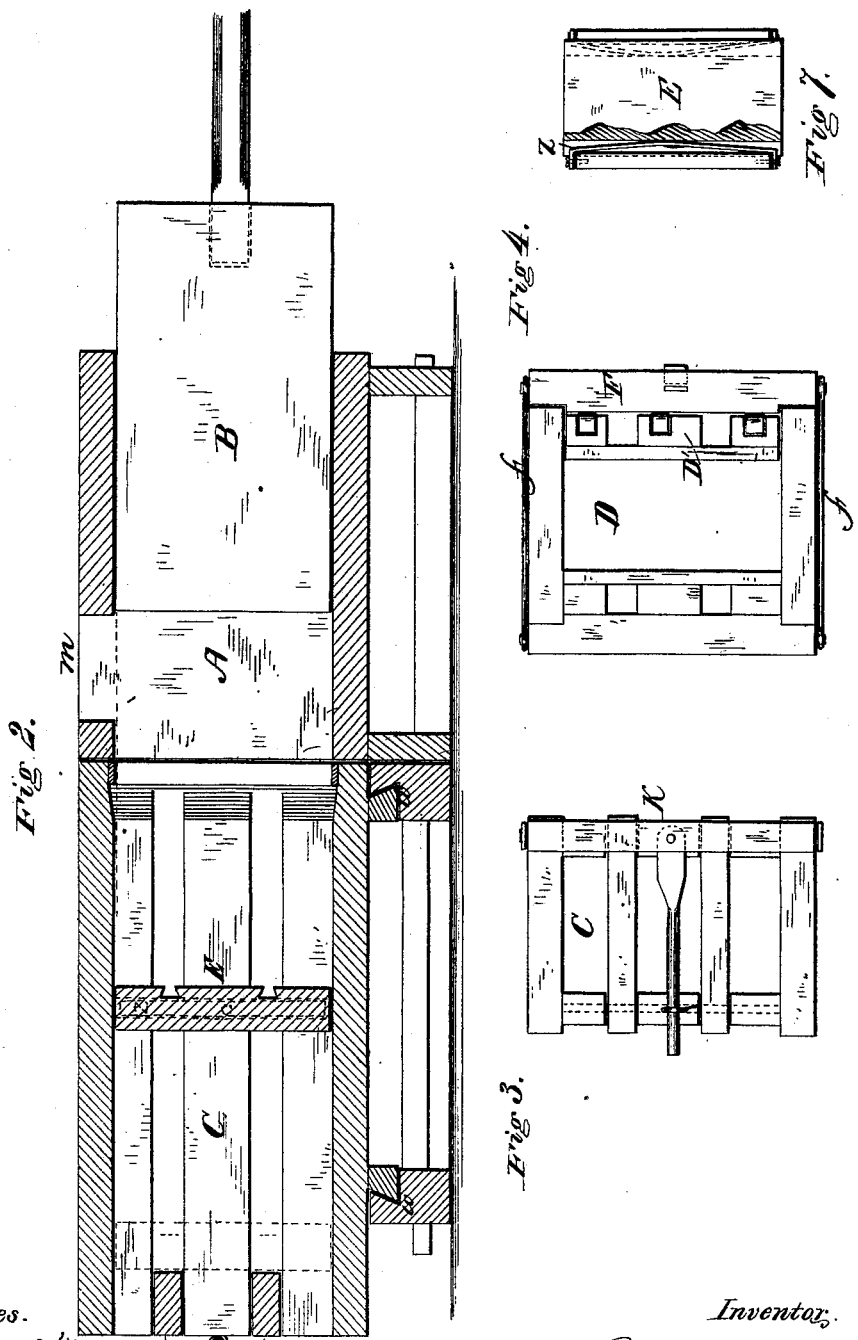

PETER K. DEDERICK, OF ALBANY, NEW YORK.

IMPROVEMENT IN BALING-PRESSES.

Specification forming part of Letters Patent No. 197,207, dated November 20, 1877; application filed March 17, 1877.

*To all whom it may concern:*

Be it known that I, PETER K. DEDERICK, of Albany, in the county of Albany and State of New York, have invented a new and useful Improvement in Baling-Presses; and I do hereby declare the following to be a full, clear, and exact description of the same, reference being had to the accompanying drawings, forming part of this specification, in which—

Figure 1 is a top-plan view. Fig. 2 is a sectional view taken through the baling-chamber C. Fig. 3 is an end view of the baling-chamber C. Fig. 4 is a similar view of the baling-chamber D. Figs. 5 and 6 are views showing, respectively, the locking-bars applied to the baling-chambers C D; and Fig. 7 is a detached view of the spring-head.

Similar letters of reference in the accompanying drawings denote the same parts.

This invention relates to that class of presses in which the bale is formed against a yielding or movable head; and the invention consists, first, in combining with a single press-box two or more baling-chambers, parallel to each other, and traveling together on a lateral or vertical track or guides past the end of the press-box, so that, while one is in line with the press-box for the purpose of forming a bale, the other will be out of line and in position for conveniently tying and removing the bale; secondly, in causing the yielding head to bear against the walls of the baling-chamber with a spring-pressure, whereby the friction between the movable head and the said walls is greatly increased, and the bale is formed with proportionately-increased compactness; thirdly, in combining with the walls of the chamber and with the sliding head a stop at the end of the chamber for the purpose of arresting the head and holding it till the bale is fully completed; and, fourthly, in combining a horizontal bale-chamber with a hinged slotted side, to enable the press to be more conveniently and efficiently operated, substantially as I will now proceed to set forth.

In the drawings, A is the press-box, preferably horizontal, into which the hay or other material to be compressed is inserted through an opening, preferably at m, and acted upon by a reciprocating plunger or follower, B.

C D are two baling chambers or boxes, arranged to travel back and forth on ways w past the open end of the press-box, as shown, said chambers being arranged parallel to each other, and preferably connected together, so as to move simultaneously.

Inside of each chamber is a sliding head or block, E, against which the bale is formed and compacted by the plunger as the hay or other material is thrust forward from the press-box, the head yielding as the material increases, but binding more or less against the walls of the chamber in which it operates, for the purpose of rendering the bale as compact as possible.

The chambers may be arranged horizontally, one over the other, to move up and down on vertical guides, instead of being arranged side by side on horizontal guides; or both the chambers and press-box may be arranged in a vertical position, in which case the chambers will be moved laterally under the lower end of the press-box.

For the purpose of increasing the friction of the movable heads against the walls of their respective chambers, I cause such head and walls (side, top, or bottom) to bear against each other with a considerable spring-pressure, which result may be accomplished either by arranging springs or spring-bearings in the edges of the head, as shown at Z in Fig. 7, or by making the walls yielding, and holding them against the edges of the head by means of springs, as shown at Y in Fig. 1.

When the springs are applied to the head the friction created by them is constant and uniform at whatever point the head may be in the chamber; but when the wall of the baling-chamber is hinged or pivoted, as shown at X, and its opposite end is held in by springs Y, it inclines slightly inward from one end of the chamber to the other, and, as a consequence, the friction increases as the head moves forward, and the bale becomes more and more compacted. With the latter form of friction device the hinged side can be swung open for the removal of the bale, the side being made slotted, as shown in Figs. 1 and 4, for convenience in applying and securing the bale hoops and ties.

The hinged side can be locked shut by means of a bar, F, connected, by straps or rods f, to the opposite side of the chamber, so as to be swung away from the end of the hinged side, in order to unlock it, as shown in Fig. 1, and the ends of the spring are bent or rounded, so that the bar can be forced over them more easily. A lever, G, is applied to the bar, for convenience in forcing it on or off of the hinged side.

At the outer end of the baling-chamber a stop or stops may be arranged to arrest the forward movement of the head, and hold it until the process of forming and compressing the bale is fully accomplished. This stop can be constructed and applied in various ways, of which I have shown but two in the drawings, to wit: one at H, rigidly attached to the end of the baling-chamber, which answers every purpose where the bale is discharged through the side of the chamber, and one or more at I, which are hinged to one side of the chamber and locked at the other by a bar, K, and which, when unlocked, swing out to allow the bale to be discharged from the open end of the baling-chamber.

The other parts of the press are constructed in the usual manner. Any form of retainers may be employed to hold the hay or the head in place during the return movement of the plunger. The press-box and chambers may be metal-lined, if preferred.

I claim as my invention—

1. The combination of a single press-box and plunger operating therein with two or more baling-chambers, arranged parallel to each other, and connected together so as to move simultaneously, and with guides arranged at right angles to the line of the press-box, whereby the chambers can be moved back and forth past the end of the press-box in right lines and simultaneously, substantially in the manner and for the purposes specified.

2. A series of independent springs attached to the hinged side of the baling-chamber or to the edges of the independent baling-head E, for the purpose of increasing the friction by which said baling-head is held against the walls of the chamber, substantially as described.

PETER K. DEDERICK.

Witnesses:
C. R. DEDERICK,
R. J. VAN SCHOONHOVEN.